United States Patent
Martinez (10) Patent No.: US 6,721,395 B2
(45) Date of Patent: Apr. 13, 2004

(54) METHOD AND APPARATUS FOR ROUTING EMERGENCY SERVICES CALLS IN AN INTELLIGENT NETWORK

(75) Inventor: Edgar Martinez, Arlington Heights, IL (US)

(73) Assignee: Nortel Networks Limited, St. Laurent (CA)

(*) Notice: Subject to any disclaimer, the term of this patent is extended or adjusted under 35 U.S.C. 154(b) by 201 days.

(21) Appl. No.: 09/974,812

(22) Filed: Oct. 12, 2001

(65) Prior Publication Data

US 2002/0054667 A1 May 9, 2002

Related U.S. Application Data

(62) Division of application No. 08/995,917, filed on Dec. 22, 1997.

(51) Int. Cl.[7] .............................................. H04Q 7/100
(52) U.S. Cl. ............... 379/45; 379/220.01; 379/201.01; 379/221.01; 379/221.03
(58) Field of Search ........................... 379/45, 37, 201, 379/211, 212, 221, 220, 219, 258, 260, 207, 229, 230, 46, 47, 48, 49, 265.01; 455/404, 461

(56) References Cited

U.S. PATENT DOCUMENTS 5,323,444 A 6/1994 Ertz et al.

(List continued on next page.)

FOREIGN PATENT DOCUMENTS

CA 2153281 1/1996

OTHER PUBLICATIONS

Abdi R. Modarressi and Ronald A. Skoog, "Signalling System No. 7: A Tutorial," IEEE Communications Magazine, Jul. 1990, pp. 1935.

(List continued on next page.)

*Primary Examiner*—William J. Deane, Jr.
(74) *Attorney, Agent, or Firm*—Withrow & Terranova, PLLC (57) ABSTRACT

Emergency services calls may be alternate-routed in an intelligent network having at least one Service Control Point (SP) with access to a routing table, a plurality of Service Switching Points (SSP) equipped with point-in-call triggers and one or more emergency services stations (PSAP). The routing table lists a routing number for each of the emergency services stations. The method comprise the steps of:

(i) at a Service Switching Point, presetting a point-in-call trigger to operate at a predetermined point in a call for emergency services,

(ii) subsequently, during processing of an emergency services call, interrupting processing of the call and transmitting to the SCP a query signalling message requesting routing information, (iii) at the SCP, accessing the routing table in dependence upon parameters in the query signalling message and obtaining a routing number for a selected emergency services operator station, forming a response signalling message including the routing number and returning such response signalling message to the SSP, (iv) at the SSP, detecting the routing number, and routing the call to the emergency services operator station.

There is also provided a method of translating signalling message parameters from a mobile protocol to an intelligent network protocol, and vice versa, to enable emergency services calls from mobile users to be routed to one or more PSAPs in the network.

3 Claims, 6 Drawing Sheets

U.S. PATENT DOCUMENTS

| | | |
|---|---|---|
| 5,379,337 A | 1/1995 | Castillo et al. |
| 5,430,719 A | 7/1995 | Weisser, Jr. |
| 5,438,568 A | 8/1995 | Weisser, Jr. |
| 5,566,235 A | 10/1996 | Hetz |
| 5,581,610 A | 12/1996 | Hooshiari |
| 5,596,625 A | 1/1997 | LeBlanc |
| 5,659,605 A | 8/1997 | Voit et al. |
| 5,664,102 A | 9/1997 | Faynberg |
| 5,862,334 A * | 1/1999 | Schwartz et al. ........... 709/223 |
| 5,867,570 A | 2/1999 | Bargout et al. |
| 5,867,788 A * | 2/1999 | Joensuu ..................... 455/445 |
| 5,881,145 A | 3/1999 | Giuhat et al. |
| 5,953,404 A * | 9/1999 | Fikis et al. .................. 379/230 |
| 6,332,022 B1 * | 12/2001 | Martinez ............... 379/220.01 |

OTHER PUBLICATIONS

John Zaharychuk and Roy Sells, BNR Ltd., "Gateway Signal Transfer Points: Design, Services and Benefits," ICC/SUPERECOM '90, pp. 0233–0240.

"Generic Switching and Signaling Requirements for Number Portability," Illinois Number Portability Workshop, Issue 1, 024, Jun. 17, 1996, pp. 1–76, Editor J. J. Lichter, Lucent Technologies.

* cited by examiner

METHOD AND APPARATUS FOR ROUTING EMERGENCY SERVICES CALLS IN AN INTELLIGENT NETWORK

This application is a division of application Ser. No. 08/995,917, filed Dec. 22, 1997.

BACKGROUND OF THE INVENTION

1. Technical Field

The invention relates to a method and apparatus for handling of calls for emergency services in telecommunications networks and, in particular, to routing within an intelligent network of emergency services calls from mobile stations.

2. Background Art

In existing telecommunications networks, particularly in North America, telephone calls for emergency services are routed to a Public Service Access Point (PSAP) which is staffed by emergency services operators and, for reasons of reliability and continuity of service, is accessed by way of a tandem switch dedicated to such emergency services. To access emergency services, the caller dials the emergency services access code, which in North America is 9-1-1. When the end office detects the digits 9-1-1, instead of routing the call like a normal voice call, it routes the call immediately to the 9-1-1 tandem switch which routes the call to the Public Service Access Point. In order to determine the most appropriate emergency services centre to provide the required services, the emergency services operator will determine the location of the caller by first obtaining the calling line identifier, either automatically if the tandem switch is provisioned with Automatic Number Identification (ANI), or by questioning the caller, and using it to access an Automatic Location Identification database and obtain the geographical location of the caller.

Although it is usual to provide a second ALI database as a "hot spare" to ensure reliability of service, this existing way of handling emergency services calls is not entirely satisfactory because, if the trunks between the end office and the dedicated tandem switch, or between the tandem switch and the PSAP, were blocked, that PSAP could not supply the necessary emergency service to that caller. A further disadvantage is that automatic location identification is not available for mobile users.

An object of the present invention is to overcome or at least mitigate these deficiencies of existing emergency services systems. To this end, the present invention provides for calls for emergency services to be alternate routed using out-of-band or common channel signalling.

SUMMARY OF THE INVENTION

According to one aspect of the present invention, there is provided a telecommunications network comprising an intelligent network portion comprising a Service Control Point (SCP), a plurality of Service Switching Points (SSP), one or more Public Service Access Points (PSAP) and a Signal Mediation Point (SMP), and a mobile network portion comprising a Mobile Services Switching Centre (MSC) for routing calls from mobile users in cell sites associated with such MSC and a Home Location Register (HLR), the MSC and SSPs being interconnected by trunks for routing calls therebetween, the MSC and SSPs being connected to the SMP by Signalling System No. 7 (SS7) signalling links, the SMP being connected to the SCP and the HLR by respective SS7 links, the SCP having access to a routing table including entries correlating routing numbers of PSAPs with cell site identifiers, the SMP having basic SCP SS7 applications part software for handling mobile or wireline TCAP messages and additional conversion software and tables for translating TCAP message parameters according to mobile protocols to TCAP message parameters using intelligent network protocols, and vice versa, the method comprising the steps of: at the MSC:

upon receipt of a 9-1-1 call from a mobile station, forming a TCAP query message addressed to the destination point code of the HLR and routing the message to the SMP, the message including a mobile identification number (MIN) for the mobile station, a cell site number, and a mobile network address for the MSC, and the dialled digits, at the SMP:

detecting the dialled digits identifying the call as an emergency services call;

translating the parameters in the message as received into corresponding AIN/IN parameters according to the intelligent network protocol being used by the SCP, forming an AIN/IN TCAP message including the translated parameters, the network address of the MSC and the cell site number being combined in an Original Calling Party number, overriding the destination point code of the HLR and routing the message instead to the SCP, at the SCP, accessing the mobile routing table using the Original Calling Party number from the received query and obtaining a routing number for a PSAP, including the PSAP network address in a TCAP response message and sending this response message to the SMP, at the SMP, translating the intelligent network parameters of the TCAP response message into corresponding mobile network parameters, and routing the response message to the MSC, at the MSC, extracting the PSAP network address from the TCAP message and routing the emergency services call thereto via one or more of the SSPs.

According to a second aspect of the invention, there is provided Signal Mediation Point apparatus comprising SCP software for processing and routing TCAP messages and conversion software for translating parameters of such TCAP messages formulated according to one or more mobile protocols into parameters according to one or more intelligent network protocols, and vice versa, the SMP having signalling links for connection to a Mobile Switching Centre, a Service Control Point and a Home Location Register, the conversion software being operative, upon receipt of a query from the MSC containing a destination point code for the HLR and dialled digits of an emergency services call to detect said digits, translate the parameters into corresponding intelligent network parameters, change the destination point code to that of the SCP, and route the message to the SCP, and on receipt of a response from the SCP, to detect the emergency services dialled digits again, translate the parameters into corresponding mobile network parameters, and route the response message to the MSC.

The conversion software may determine a network address of the mobile switching centre and a cell site identifier and combine both into an Original Calling Party number in the intelligent network TCAP message sent to the SCP.

Various objects, features, aspects and advantages of the present invention will become more apparent from the following detailed description, taken in conjunction with the accompanying drawings, of preferred embodiments of the invention, which are described by way of example only.

DESCRIPTION OF PREFERRED EMBODIMENTS

Figure 1:
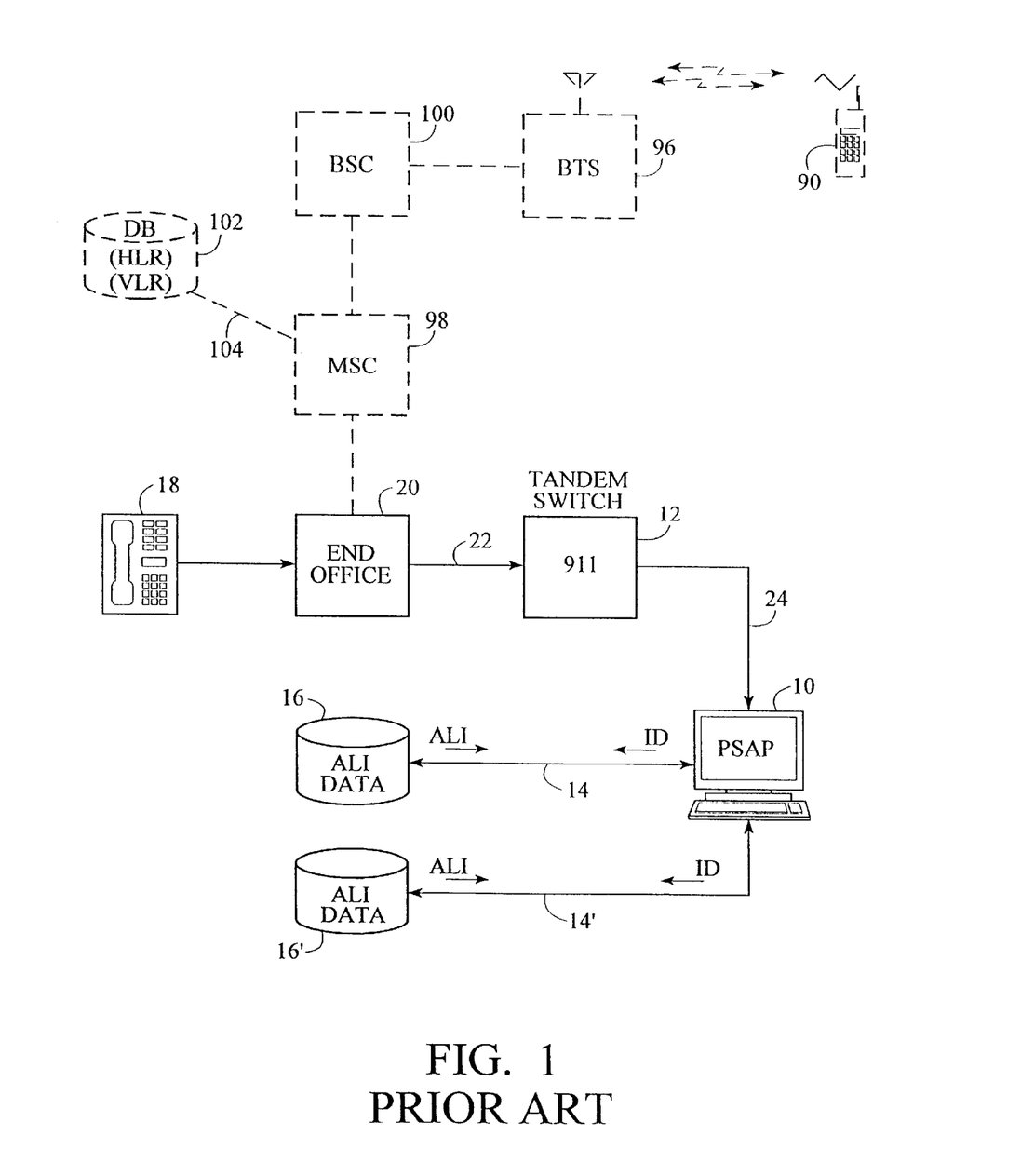
FIG. 1, labelled PRIOR ART, is a simplified schematic diagram illustrating equipment in existing telephone systems for handling "9-1-1" calls to emergency services operators.

Referring to FIG. 1, labelled PRIOR ART, existing telephone systems, particularly in North America, comprise a Public Service Access Point (PSAP) 10, which is a station staffed by emergency services operators and accessed by way of a tandem switch 12 dedicated to such emergency services. In order to enable automatic identification of the location of the caller requesting emergency services, the PSAP 10 has access, by way of a data link 14, to an automatic location identification (ALI) database 16. A second ALI 16' connected by way of a separate data link 14' is provided as a "hot spare" to ensure reliability of service. To access emergency services, a caller using station apparatus 18 connected to an end office 20 dials the emergency services three-digit access code, which, in North America, is 9-1-1. The end office 20 detects the digits 9-1-1 and routes the call immediately to the 9-1-1 tandem switch 12, which routes the call to the PSAP 10. If the tandem switch 12 is provisioned with Automatic Number Identification (ANI), the calling line identifier will be available to the operator automatically. If it is not, the operator will question the caller to obtain the necessary information. The operator will use the calling line identifier to access the Automatic Location Identification database 16, in order to obtain the geographical location of the caller, determine the most appropriate (usually the closest) emergency services centre to respond to the call, and relay the information to that centre using known "special" call transfer procedures and the usual data network interconnecting PSAPs and emergency services centres.

If the data link 14 to the Automatic Location Identification database 16 were to fail, the second ALI database 16' could be used to ensure reliability of service. If both of the ALI databases were inaccessible, the operator could still ask the caller for his or her geographical location. However, if the trunks 22 between the end office 20 and the dedicated tandem switch 12, or the trunks 24 between the tandem switch 12 and the PSAP 10, were blocked, the PSAP 10 could not supply the necessary emergency service to that caller.

If a normal voice call could not be completed, some form of alternate routing via another office might be used. For emergency services calls, however, alternate routing via other offices, especially using SS7 signalling, has not, hitherto, been used for reliability reasons. The originating office may attempt different trunks but, once its list is exhausted, has no alternative but to reject the emergency services call. The present invention proposes providing alternate routing of emergency services calls within intelligent networks employing out-of-band signalling in such a way that reliability requirements are met.

The out-of-band network signalling system adopted by the International Consultative Committee for Telephone and Telegraph (CCITT), is known as Signalling System No. 7 (SS7). For an overview of SS7, the reader is directed to an article entitled "Signalling System No. 7 : A Tutorial" by A. R. Modarressi and R. A. Skorg, *IEEE Communications Magazine*, July 1990, which is incorporated herein by reference. The kind of SS7 system used in North America is known as Common Channel Signalling System No. 7 (CCS7).

Telecommunications systems known as "Intelligent Networks" (IN) or "Advanced Intelligent Networks" (AIN) employ Signalling System No. 7 (SS7) to exchange messages between network elements to deploy selected services, and between network node switching elements to set up and route calls. The messages are handled by the SS7 data communications system which is separate from the trunks which carry the calls themselves. (For a general description of intelligent network components and operation, the reader is directed to U.S. Pat. Nos. 5,581,610 and 5,438,568 which are incorporated herein by reference.)

The main elements of such intelligent networks include Service Switching Points (SSPs), Signal Transfer Points (STPs) and Service Control Points (SCPs) connected to each other by SS7 data links for carrying signalling. All of these components have similar Message Transfer Part (MTP) and Signalling Connection Control Part (SCCP) communications software to enable them to communicate with each other via the SS7 data communications network. A Service Control Point is an "intelligence centre" with specific logic and access to application databases enabling it to deliver various combinations of features, such as 1-800 number service and call redirection. A Signal Transfer Point (STP) is a signalling hub or concentrator, typically connecting several Service Switching Points to an SCP. A Service Switching Point (SSP) is a network node normally associated with a stored program central office switch equipped with Signalling System Number 7 (SS7) messaging links to permit communication with the SCPs and which, in addition to the usual call processing software, has special Service Signalling Function (SSF) software. The SCP has comparable Service Control Function (SCF) software.

The Service Signalling Functions include (i) Transaction Capabilities Application Part (TCAP) messaging, which SSPs and SCPs use to determine how to process a particular call, and (ii) Integrated Services User Part and Capability (ISDNUP) messaging which the SSP switches use to set up a path for a particular call once it has been determined whence the call should be routed.

The SSP's AIN software includes a plurality of "Point-in-Call triggers" which can be provisioned or set to interrupt call processing momentarily and initiate a TCAP query to the SCP for instructions on how to complete the call processing. Based upon the instructions received in a TCAP message in reply, the originating end office switch seizes a trunk to a neighbouring switch and creates an Initial Address Message which it sends to the neighbouring switch via the SS7 network. The Initial Address Message includes various parameters which will control routing of the call to its destination.

The SSP is a logical entity. For convenience, the SSPs will be described herein as performing various functions which, in reality, will be performed by the associated physical switch.

Figure 2:
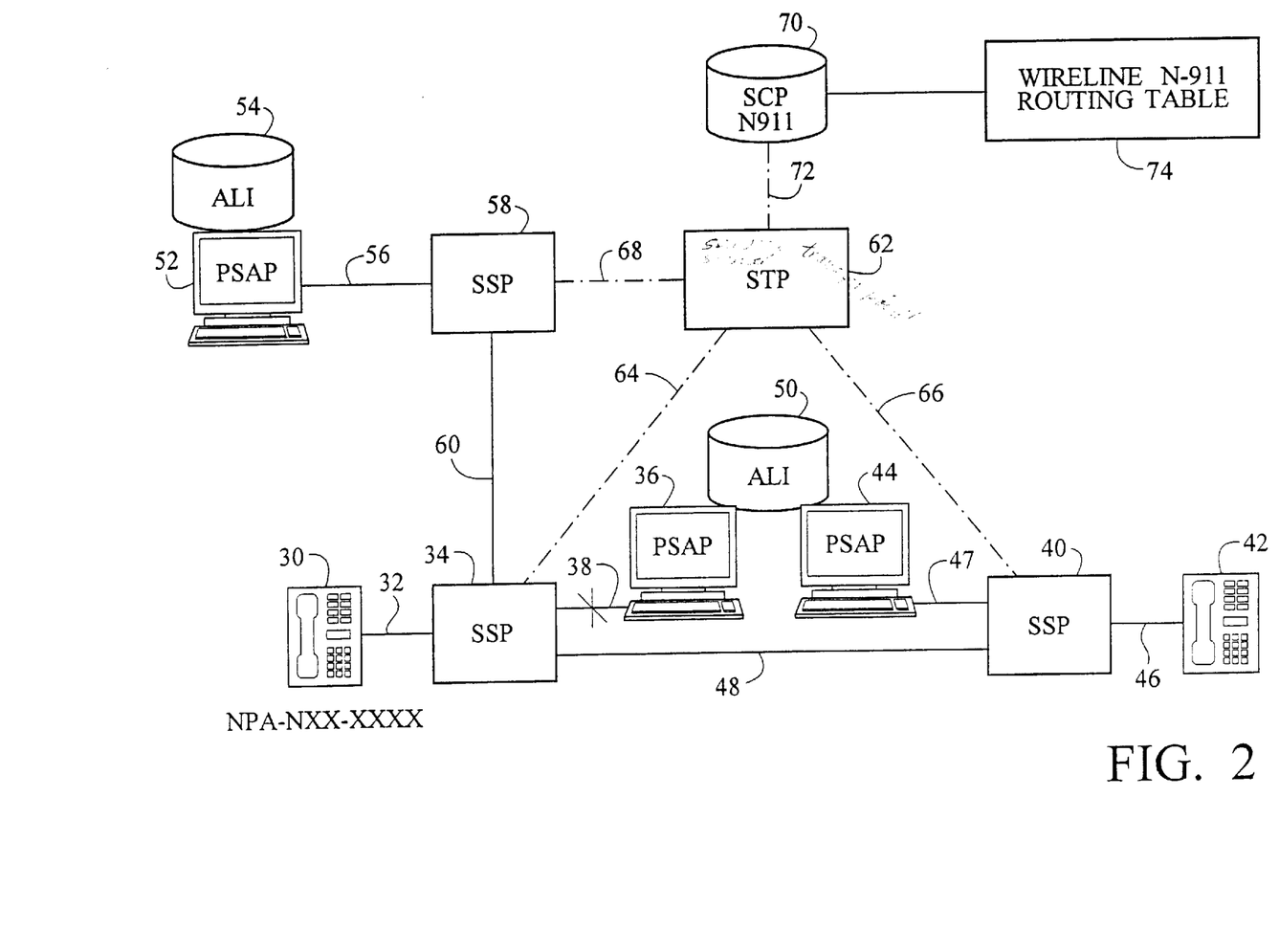
FIG. 2 is a simplified schematic diagram illustrating a portion of a so-called "intelligent network"

A method and apparatus in which SS7 is used to provide emergency services are disclosed and claimed in applicant's U.S. Pat. No. 6,332,022, issued December 2001 and will now be described with reference to FIG. 2, which illustrates a portion of an "intelligent network" telecommunications system. In FIG. 2, a first subscriber apparatus 30 is connected by subscriber loop 32 to a Service Switching Point 34 which comprises an end office switch. A first Public Service Access Point 36 is connected to SSP 34 by trunks 38 for voice calls. A second Service Switching Point 40, which comprises a second end office switch, has a second subscriber apparatus 42 connected to it by subscriber loop 46. For purposes of this description, the subscriber apparatuses 30 and 42 will be assumed to have Calling Party numbers NPA-NX1-XXXX and NPA-NX2-XXXX, respectively. A second Public Service Access Point 44 is connected to SSP 40 by trunks 47. The two Service Switching Points 34 and 40 are interconnected by trunks 48. The two Public Service Access points 36 and 44 share a common Automatic Location Identification database (ALI) 50. A third Public Service Access Point 52 with which is associated a second Automatic Location Identification database 54 is connected by trunks 56 to a third Service Switching Point 58 which is connected to first Service Switching Point 34 by trunks 60.

The three Service Switching points 34, 40 and 58 are connected to a Signal Transfer Point 62 by SS7 messaging links 64, 66 and 68, respectively, and the Service Transfer Point 62 is connected to a Service Control Point 70 by SS7 messaging link 72.

The Service Control Point 70 has the usual SCF software and databases enabling it to function according to Advanced Intelligent Network (AIN) requirements. The SMS is not shown in FIG. 2 since its functions do not affect this embodiment of the invention. For details of the requirements of network elements of AIN networks, the reader is directed to the various accepted or proposed AIN standards, especially, TR-NWT-001284 AIN 0.1 SSP Generic requirements; TR-NWT-001285 AIN 0.1 SCP interface; GR-1298-CORE AIN 0.2 Generic requirements; and GR-1299-CORE AIN 0.2 SCP interface.

SCP 70 is dedicated to 9-1-1, for reliability reasons, but supports wire-line and wireless calls as will be described later. It has special 9-1-1 feature software and its database will have networked 9-1-1 entries in its routing table 74, which is shown separately from the SCP 70. This special 9-1-1 software will enable the SCP 70 to process 9-1-1 signalling messages only and access the 9-1-1 routing tables. Otherwise, it will be like known SCP software.

The system of FIG. 2 could route 9-1-1 calls using a variety of Point-In-Call triggers. Examples of 9-1-1 call routing will now be described with reference to FIG. 2 and sample entries for routing table 74.

Where the SSP 34 and the associated PSAP 36 are interconnected by trunks, as in FIG. 2, it is appropriate to use the Automatic Flexible Routing (AFR) trigger. It should be noted that, for convenience of illustration, the PSAPs 36, 44 and 52 are shown connected directly to the respective SSPs 34, 40 and 58. In practice, regulations may require each PSAP 36/44 to be connected to a tandem office, at least until it has been accepted that this new routing technique render such dedicated tandem switches unnecessary. Hence, each of the Service Switching Points 34 and 40 can be taken as representing the end office 20 and tandem switch 12 of FIG. 1.

Assuming that the "Automatic Flexible Routing" trigger at SSP 34 has been provisioned, when a caller using subscriber apparatus 30 dials 9-1-1, the end office switch at SSP 34 will first translate the dialled digits in the usual manner and attempt to route the call to PSAP 36, via one of the trunks 38. If all trunks 38 are busy, which could happen if there were a catastrophic event, or the trunks 38 are not available to take the call for other reasons, as indicated in FIG. 2, the call will not complete. Consequently, when the switch's route list has been exhausted, and after checking for any code gapping requirements, the Automatic Flexible Routing trigger at the switch of SSP 34 will cause the call-processing software to interrupt call processing and send a Network_Busy TCAP query to the SCP 70, via SS7 link 64, Signal Transfer Point 62 and link 72, to request alternate routing instructions. Among other things, the TCAP query will contain the Calling Party number, i.e. NPA-NX1-XXXX, and the Called Party number, i.e. 9-1-1.

The SCP 70 will respond with an Analyze_Route response message.

The SCP 70 will detect the Calling Party number in the received TCAP message, access its 9-1-1 Routing Table (see Table I) to determine that primary PSAP was PSAP 36, and select the routing number of an alternative PSAP.

TABLE I

Wireline N-9-1-1 Routing Table 74

| Calling Party # | Primary PSAP | Alternative PSAP |
| --- | --- | --- |
| NPA-NX1 | PSAP 36 | PSAP 44; PSAP 52 |
| NPA-NX2 | PSAP 44 | PSAP 34; PSAP 52 |

PSAP Routing Numbers
PSAP 36 = NPA-NX1-AAAA
PSAP 44 = NPA-NX2-BBBB
PSAP 52 = NPA-NX3-CCCC As shown in Table I, both PSAP 44 and PSAP 52 are available. The SCP 70 will select one of them, say PSAP 44, and return to SSP 34 an Analyze_Route TCAP message with the network address, in this example the routing number NPA-NX2-BBBB of PSAP 44 in the Called Party field. Optionally, it might also include a route index. Upon receipt of this Routing Number, the switch at SSP 34 will resume call processing and use ISDNUP messaging to route the call to PSAP 44 by way of trunks 48, and SSP 40 will complete the call via trunks 47 based upon the 9-1-1 digits in the Original Called Party field of the ISUP messages. PSAP 44 will access Automatic Location Identification database ALI 50 to determine customer information, such as specific medical condition of the caller, i.e. owner of station apparatus 30.

It should be appreciated that this system is quite flexible and could accommodate various other trunks being unavailable. For example, if trunks 47 between PSAP 44 and SSP 40 were down also, i.e. both PSAP 36 and PSAP 44 were inaccessible, the SCP 70 would route the call to PSAP 52 via SSP 58. Thus, if the SCP 70 had received a Network_Busy query because PSAP 44 were unavailable, within a recent time period, it would mark its routing table accordingly.

If, for some reason, the SCP 70 was unaware that the trunks 47 to PSAP 44 also were unavailable, and gave SSP 34 the routing number for PSAP 44 as an alternative, SSP 34 would route the call via trunks 48 to SSP 40. SSP 40 would try to complete the call via trunks 47 and itself encounter an AFR trigger when it could not complete. Consequently, SSP 40 would send a Network_Busy TCAP query to SCP 70.

Upon receipt of this second query, the SCP 70 would access its routing table 74 for an alternative route to PSAP 40. The SCP 70 would "know" that PSAP 36 was temporarily unavailable.

Consequently, in the Analyzed_Route TCAP message it returned to SSP 40, SCP 70 would give the routing number for PSAP 52 and route the call to PSAP 52 via SSP 58. FIG. 2 does not show a direct trunk between SSP 40 and SSP 58, so SSP 40 would have to route the call to SSP 52 via trunks 48, SSP 34, trunks 60 and SSP 58. This would entail loop-back in the trunks 48, but this could be tolerated in these circumstances. In a practical system, of course, there would probably be a direct trunk from SSP 40 to SSP 58.

Provision may be made for limiting the alternate PSAP selection according to time-of-day, or other conditions, simply by including in the Routing Table 74 additional entries as shown, for example, in Table II.

TABLE II

PSAP selection by Time-of-Day
Time of Day between 12:00 am and 6:00 am

| Calling Party # | Primary PSAP | Alternative PSAP |
| --- | --- | --- |
| NPA-NX1 | PSAP 36 | PSAP 52; PSAP_OutOfArea |
| NPA-NX2 | PSAP 44 | PSAP 52; PSAP_OutOfArea |

PSAP Routing Numbers
PSAP 52 = NPA-NX3-CCCC
PSAP_OutOfArea = NPA-N33-DDDD

In this case, for example, only PSAP 52 is fully staffed between 12:00 midnight and 6:00 am.

Upon receipt of a 9-1-1 call query, the Service Control Point 70 would check the time of day and, if it were between midnight and 6.00 am, route the 9-1-1. call to PSAP 52. To determine the caller's particulars, PSAP 52 would access its own ALI database 54 which will include similar information to that in ALI database 50. In this case, there are no other active PSAP's in the area served. Consequently, in the event that PSAP 52 could not handle the call, for example because all of trunks 56 were busy, or ALI 54 inaccessible, the SCP 70 would route the 9-1-1 call to a PSAP in another area, i.e. the SCP 70 would obtain from the routing table 74 a routing number for the OutOfArea PSAP and return it to the originating SSP 34. In the event that the OutOfArea PSAP did not have access to an ALI database with information for the caller, the operator could seek the necessary information from the caller.

It will be appreciated that routing to a PSAP in a different area could be an option in the unlikely event that a major catastrophe rendered all three PSAP's unavailable simultaneously.

Whereas, in the network of FIG. 2, each SSP has a direct connection to a PSAP and only uses the SS7 system when it fails to complete the 9-1-1 call directly, it is envisaged that, eventually, the majority of SSP's will access a PSAP via the network. There will not necessarily be a dedicated tandem switch for 9-1-1 calls. It is also envisaged that, as Local Number Portability and other such services are introduced, it will be preferable for every call to be routed only after a query to the SCP for a routing number. In such a situation, instead of using the Automatic Flexible Routing trigger after a normal completion attempt, a "three-digit" trigger responsive to dialled digits could be used to initiate a TCAP query on every call, including 9-1-1 calls. In North America, such a trigger is already used for other three digit numbers, such as 4-1-1 to select directory enquiries.

Figure 3:
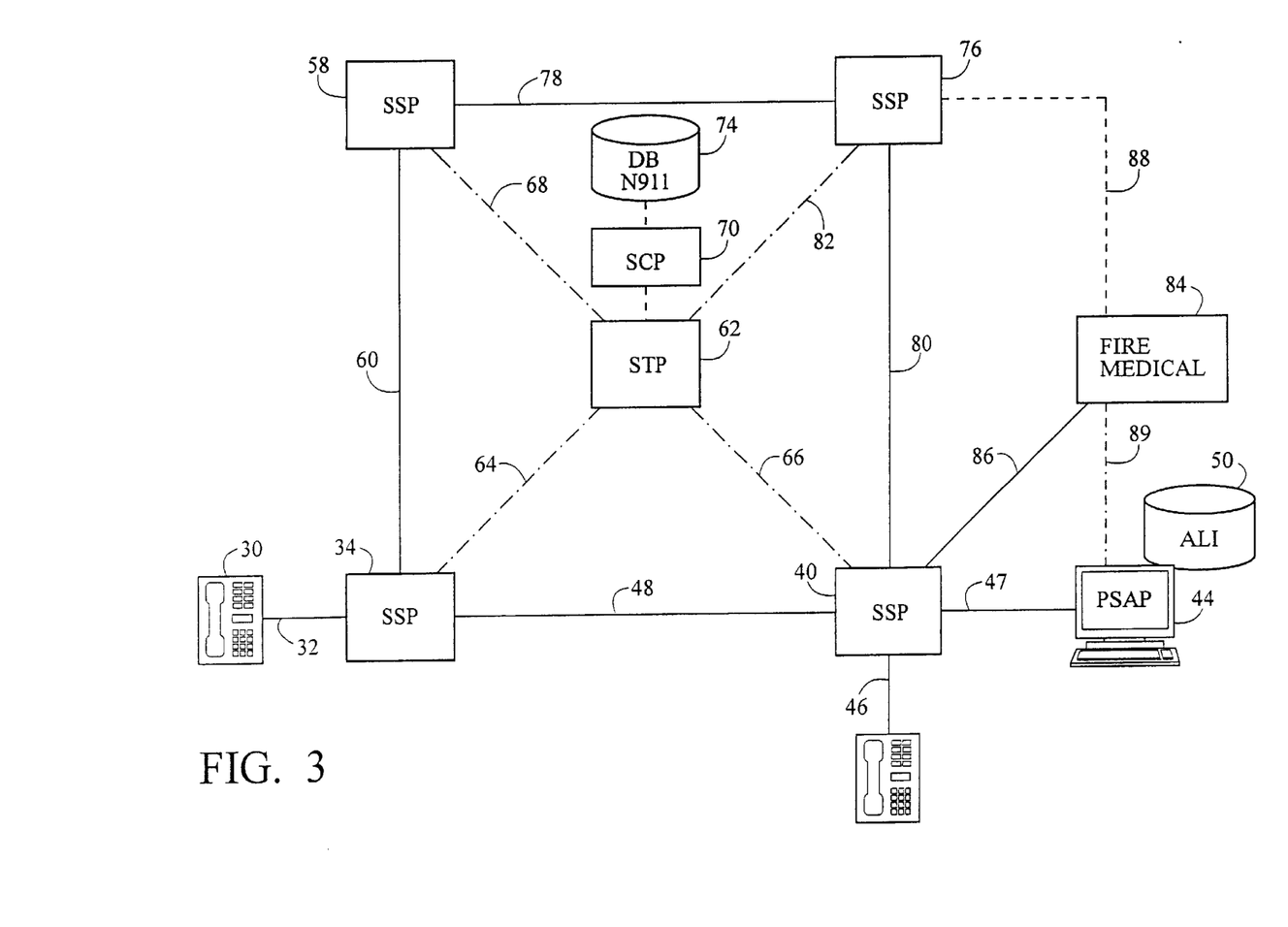
FIG. 3 is a simplified schematic diagram of a modification of the network of FIG. 2.

An example of such triggering on every call will be described with reference to FIG. 3 which shows a portion of the network similar to that of FIG. 2 but modified so that there is only one Public Service Access Point 44, with an associated Automatic Location Identification database 50, connected as before to SSP 40. In addition to the SSPs 34, 40 and 58, there is a fourth SSP 76 connected by trunks 78 and 80 to SSPs 58 and 40, respectively, and by SS7 link 82 to STP 62. In addition, an emergency services location 84 (for Fire and Medical services) is shown connected to SSP 40 by trunks 86, for voice calls, and to PSAP 44 by a data link 89 of the usual data network which interconnects PSAPs, ALIs and emergency services locations. The emergency services location 84 could also be connected by trunks 88 (shown in broken lines) to SSP 76, in which case the SSP 40 could route calls to it via SSP 76.

The call processing software at each of the SSPs 34, 40, 58 and 76 has a three-digit trigger set to trigger on receipt of the dialled digits 9-1-1. Hence, when a calling party at station 30 at SSP 34 dials 9-1-1, SSP 34 will immediately query the SCP 70 by sending it an Info_Analyzed TCAP query containing the dialled digits as the Called Party number and NPA-NX1-XXXX as the Calling Party number. The SCP 70 will access its 9-1-1 routing database, which will be similar to that shown in Tables I and II and determine the Routing Number of PSAP 44 and return it to SSP 34 in an Analyze_Route TCAP response. On receipt of the response, SSP 34 will route the call via SSP 40 to PSAP 44. As before, when PSAP 44 receives the call, it will automatically access its ALI database 50 to determine the customer's particulars, preferably using Automatic Number Identification, as before. Once the location has been identified, the PSAP operator will route the call to the emergency services location 84. Of course, if PSAP 44 is not available, SCP 70 may provide routing to an alternative, which may be out of area, as before.

It should be appreciated that both AFR Point-in-Call triggers and three-digit 9-1-1 Point-in-Call triggers could be used together. For example, the originating SSP end office could trigger on the 9-1-1 digits and route the call to the appropriate PSAP. In the event that, at some point, the trunks were not available, an AFR trigger could initiate a TCAP query for an alternative route to complete the call to the designated PSAP or, if that were not possible, to complete the call to an alternative PSAP as described with reference to FIG. 2.

It is also envisaged that an 0_Disconnect trigger could be provisioned (as defined in AIN 0.2) so as to initiate a query for an alternate route, or an alternate PSAP, if an active emergency services call were interrupted, for example, by a loss of connection.

It should also be appreciated that, if SSP 40 were an end office with a dedicated 9-1-1 tandem switch, as in FIG. 1, the SSP 34 and office could use an AFR trigger to obtain an alternative PSAP if the trunks between the end office and tandem switch of SSP 40 were "down".

It should be appreciated that the above-described embodiments of the invention are not limited to the use of the AFR triggers for initiating queries to the SCP 70. It would be possible to use instead the Termination Attempt Trigger (TAT) which is line specific.

It is envisaged that, eventually, the SSPs might use "three digit" Point-In-Call triggering on the dialled digits 9-1-1 without first attempting to complete the call normally. At present, however, it is not thought to be feasible to trigger on every 9-1-1 call, i.e. without first attempting to complete the call, but rather to attempt completion and issue a query only when the initial attempt fails.

In any of the above-described networks, station apparatus dedicated for use in emergencies could be accommodated. For such apparatus, an Originating Call Point-in-Call trigger could be used so that, as soon as the dedicated station apparatus went "off hook", the associated SSP would generate a TCAP query for routing instructions.

An advantage of the present invention is that it can provide automatic location identification for 9-1-1 calls from mobile stations, i.e. cellular telephone users.

At present, call routing in the conventional mobile system is distinct from that in the conventional wire-line system. The existing North American mobile telecommunications network already has SS7 communication capability using IS41 messages, which are somewhat similar to TCAP messages in AIN networks. Elsewhere, Global System for Mobile Communications (GSM) messages are used instead. As illustrated in broken lines in FIG. 1, in a conventional North American network, calls to and from a mobile user 90 are relayed via transceivers in intervening cell sites to a base transceiver station (BTS) 96 connected to a mobile services switching centre (MSC) 98 by way of a base station controller (BSC) 100. A database 102 containing a Visitor Location register (VLR) is associated with MSC 98. The MSC will also have access to a Home Location Register (HLR) which, for convenience, is shown as part of the same database 102. In practice, each MSC will have a local VLR but will access a remote HLR. The HLR stores permanent data on subscribers who purchased a subscription from the operator to whom the HLR belongs. The VLR is a temporary register for visiting users. When a mobile station from another area enters the area covered by MSC 98, the MSC 98 will request data about the visiting mobile station from its home HLR via the signalling system. The HLR/VLR database 102 could be located at the MSC 98. Alternatively, as shown in FIG. 1, the MSC 98 could communicate with a remote HLR/VLR database 102 by way of a SS7 link 104. (It should be noted that, in conventional wireline switching systems, the routing tables are at the switches whereas, in mobile networks, the routing tables are at the HLR. Hence, the mobile switching centre MSC 98 must generate a TCAP query for every call.)

In practice, there would probably be several switches, whether SSPs or conventional switches, connected to the mobile switching centre MSC 98 by trunks. A normal call would be routed via any one of those according to what the HLR/VLR database 102 determined to be appropriate having accessed its routing tables. However, all 9-1-1. calls received by MSC 98 from mobile users would be sent to end office 20 for completion to the associated PSAP 10 via tandem switch 12. There would be no possibility of the HLR/VLR database 102 providing a routing number to route the 9-1-1 call elsewhere. Consequently, the conventional mobile network is inflexible and unreliable because an outage of the trunks between end office 20 and PSAP 10, or between the MSC 98 and the end office 20, will result in there being no 9-1-1 service capability for mobile users accessing the network via MSC 98. Moreover, for 9-1-1 calls from mobile users, automatic location identification is not available; the operator must ask the caller for the necessary information as to his/her geographical location.

An embodiment of the present invention which provides flexible or alternate routing of 9-1-1 calls from a mobile user, and, in some cases, automatic location identification, will now be described with reference to FIG. 4. The portion of the "intelligent network" shown in FIG. 4 comprises some wireline components similar to those of FIG. 2, namely two Service Switching Points SSP 34 and SSP 40 interconnected by trunks 48; Public Service Access Points 36 and 44 connected by trunks 32 and 47 to SSP 34 and SSP 40, respectively; station apparatuses 30 and 42 connected to SSP 34 and SSP 40, respectively; and a Service Control Point 70. An STP 62' is shown connecting SSP 40 to the SMP 106 by way of SS7 links 66' and 66".

Figure 4:
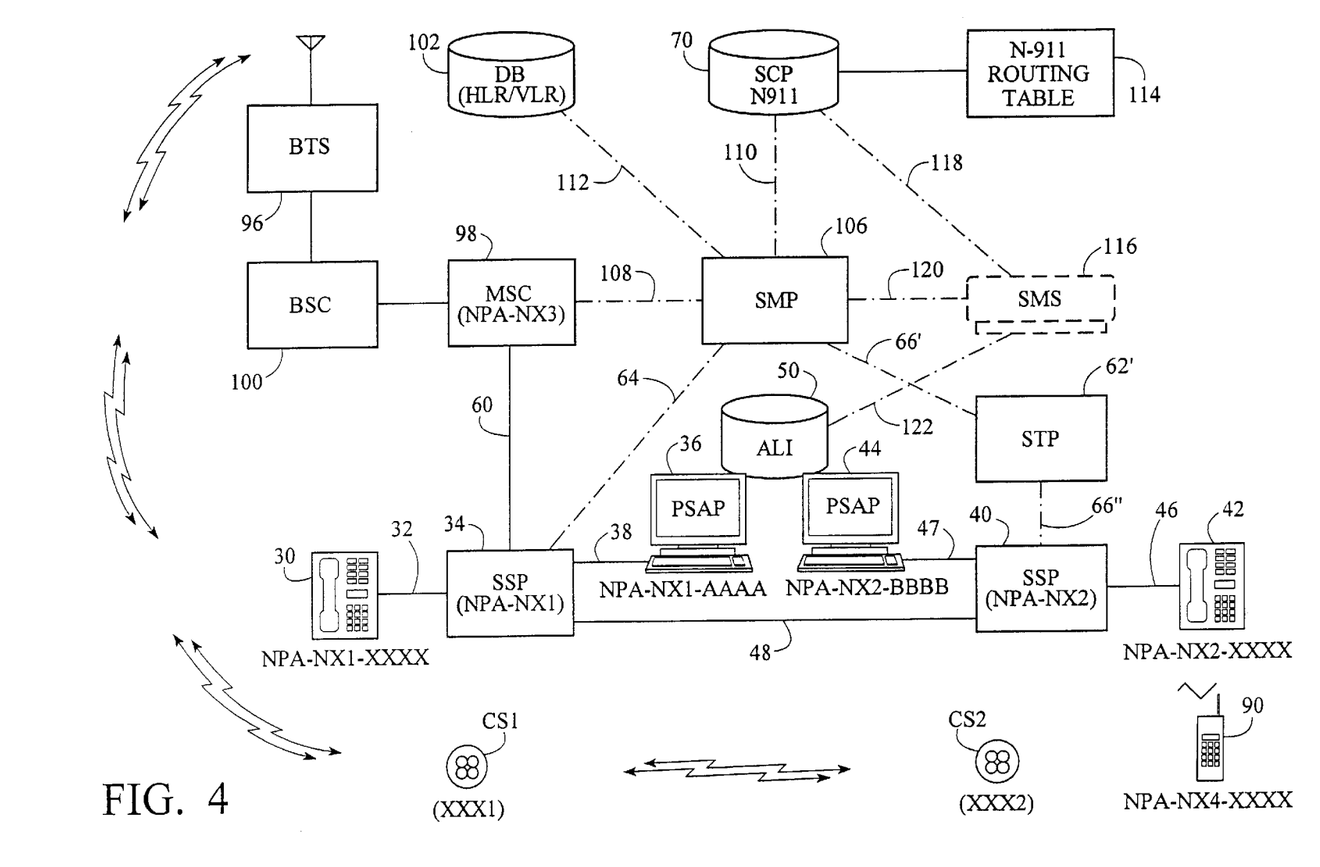
FIG. 4 illustrates an embodiment of the invention for handling emergency services calls from mobile users.

In addition, the network portion of FIG. 4 includes some wireless elements similar to those shown in FIG. 1, namely a mobile user 90 communicating with a MSC 98 via transceivers in cell sites CS1 and CS2, a base transceiver station 96 and a base station controller 100.

A significant difference is that the STP 62 of the network of FIG. 2 is replaced by a Signal Mediation Point (SMP) 106 which is connected to SSP 34, SSP 40, MSC 98, SCP 70 and HLR 102 by SS7 links 64, 66, 108, 110 and 112, respectively. Generally, the SMP 106 comprises similar software and data to those of an SCP. It differs, however, in that it also has software and data for converting from wireline parameters to wireless parameters, and vice versa. Hence, as will be described in more detail later, the SMP 106 can function as a STP but can also modify the message content, which a STP cannot normally do.

The Routing Table 114 accessed by the SCP 70 includes mobile information in addition to the entries of Routing Table 74 of FIG. 2. For example, as shown in Table III, the additional mobile information includes an entry for the Calling Party Number of the mobile user 90, namely NPA-NX4-XXXX; the MSCID for MSC 98; cell site identifiers for cell sites CS1 and CS2 and, for each cell site identifier, Primary and Alternate PSAP routing numbers. Conveniently, the cell site identifiers are linked to the corresponding PSAP locations on a geographical basis.

TABLE III

Mobile N-911 Routing Table

| Mobile-Calling Party Number | MSCID | Cell Site | Primary PSAP | Alternate PSAP |
|---|---|---|---|---|
| NPA-NX4-XXXX | NPA-NX3 | XXX1 | PSAP-1 | PSAP-2, PSAP-3 |
|  | NPA-NX3 | XXX2 | PSAP-2 | PSAP-1, PSAP-3 |
| Time of Day From 12 am to 6 am | | | | |
| NPA-NX4-XXXX | NPA-NX3 | XXX1 | PSAP-1 | PSAP_OutofArea |
|  | NPA-NX3 | XXX2 | PSAP-3 | PSAP_OutofArea |

The SMP 106 will have similar data to that in columns 1–3 of Table II enabling it to determine the cell site identifier from the cell site number in the incoming query from the MSC 98.

Also shown in FIG. 4 is a Service Management System (SMS) 116 which provides for provisioning and updating of customer data in the databases at the SCP 70, the SMP 106 and the ALI 50 by way of X.25 links 118, 120 and 122, respectively, enabling it to synchronize the data in them. The SMS 116 is a known element of intelligent networks and its normal functions are defined in the various standards, such as AIN 0.1. In FIG. 4, the various trunks between the SSPs are not shown. Only the trunks between MSC 98 and SSP 34, and between SSP 34 and SSP 40 are shown, together with the SS7 links.

The MSC 98 has ISDNUP capability enabling it to exchange ISDNUP messages with the wireline service switching points SSP 34 and SSP 40 to set up the trunks for the call.

The MSC 98 communicates with the HLR 102 by way of the SMP 106, rather than direct. For a normal call, the MSC 98 will use IS41 messages to communicate with the HLR 102 by way of the SMP 106 to obtain the necessary routing number or route index and then will route the call via the appropriate trunk group. Although the MSC 98 is shown with trunks to SSP 34 only, in practice it would be connected to other SSPs also. It is no longer limited to routing all 9-1-1 calls to the one SSP 34, however, but could route a 9-1-1 call to a PSAP elsewhere in the network.

When the mobile station user first switches on the cellular telephone of mobile station 90, it will automatically transmit a message identifying itself. When the MSC 98 receives this message, it will incorporate the mobile station's ID into an IS41 message and send it to the HLR 102, via the SMP 106, to effect registration. The HLR 102 will check the identification against its database (not shown) to ensure that it is valid. When, subsequently, the mobile user 90 makes or receives a normal call, the MSC 98 will exchange IS41 messages with the HLR 102, via the SMP 106, to set up the call.

If a mobile user enters the area, a temporary registration process will be effected using the VLR register of database 102, in known manner.

For normal calls from mobile user 90, including initial registration calls, the SMP 106 acts like a STP, i.e. it is virtually transparent and simply does whatever correlation is necessary to route the message from the MSC 98 to the HLR 102, or vice versa. It does not change the content of the message. For a 9-1-1 call from mobile user 90, however, the process is different. The Signalling Mediation Point 106 intercepts the query sent from the MSC 98 to the HLR/VLR database 102 and redirects it to the SCP 70 instead. At least at present, the SCP 70 will not be able to "understand" IS41 queries, so the SMP 106 translates the query to AIN or IN format, whichever is required by SCP 70. The SCP 70 accesses its routing table 114, obtains the routing number of the appropriate PSAP, 36 or 44, and returns a response to the MSC 98 via the SMP 70. The SMP 106 translates the response from the SCP 70 from AIN/IN format to IS41 format before conveying it to the MSC 98.

Figure 5:
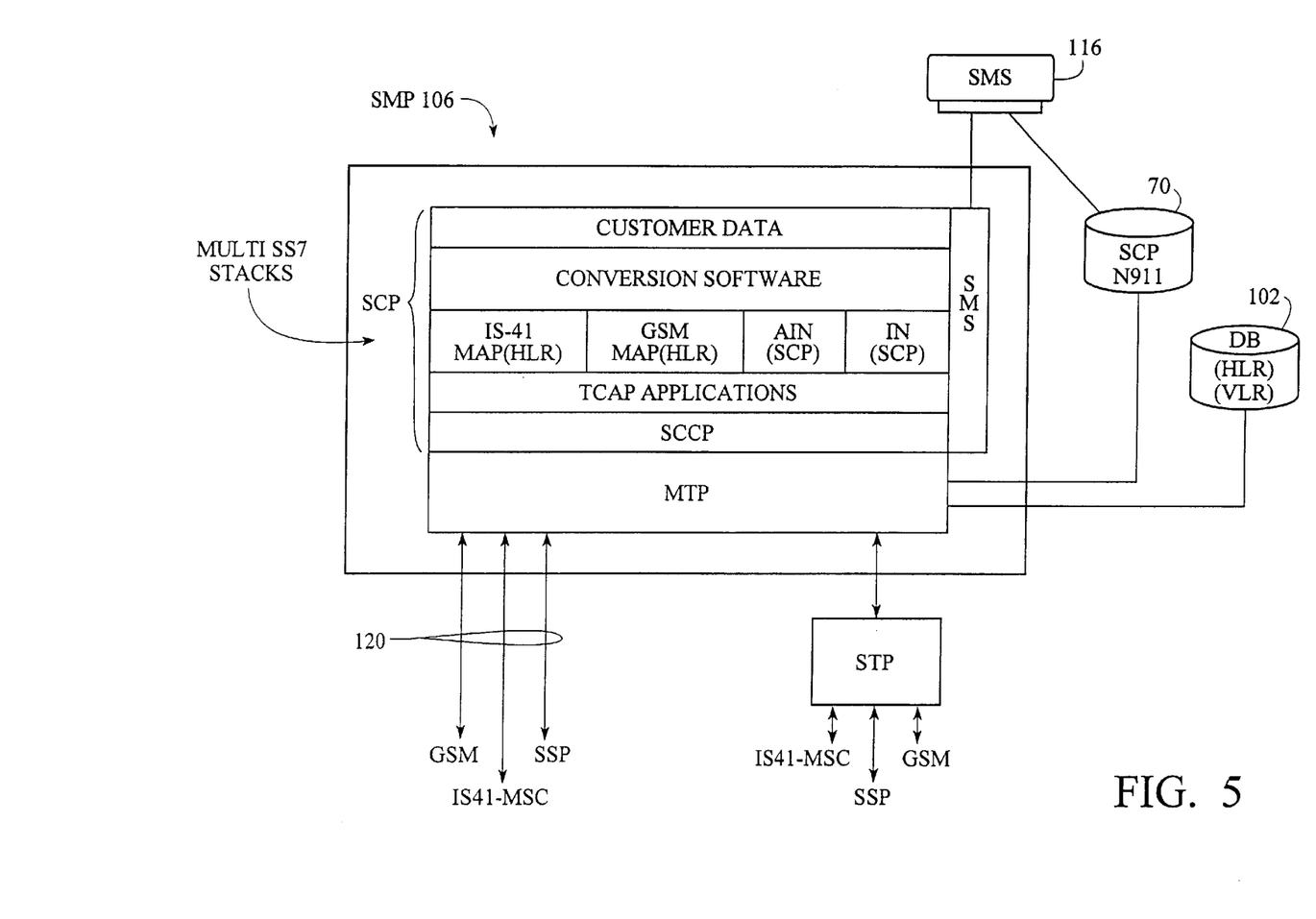
FIG. 5 illustrates software modules within a signal mediation point of the network of FIG. 4.
Figure 6:
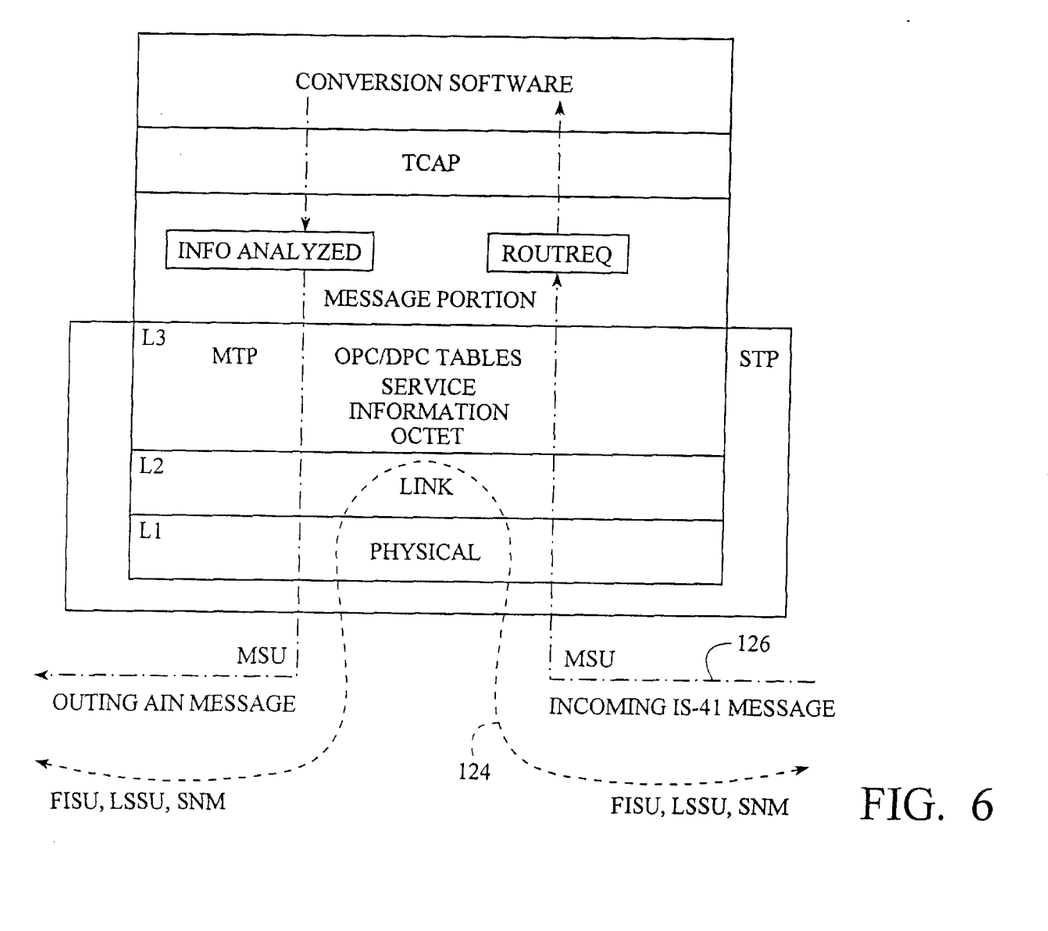
FIG. 6 illustrates message flows within the signal mediation point.

The various software components of the SMP 106 which are involved in this transaction are depicted in FIG. 5 and typical call flow through the SMP 106 in FIG. 6. Thus, as shown, the SMP 106 contains Message Transfer Part (MTP) and Signalling Connection Control Part (SCCP) modules and Originating Point Code/Destination Point Code (OPC/DPC) tables which allow it to function like a STP, i.e. detect information in the Service Information Octet (SIO) and route TCAP messages accordingly.

The SMP 106 also has components normally found in a Service Control Point, namely a TCAP APPLICATIONS module, a component layer with four TCAP domain modules namely IS-41 Mobile Applications Part Module (ISM MAP), a GSM MAP, and AIN and IN domains, and CUSTOMER DATA. The SMP 106 also has a SMS software module for interfacing with the SMS 116 to allow updates, etc. Operation of these components is according to the established standards and so will not be described herein.

In addition, the SMP 106 has CONVERSION software for converting between IS41/GSM protocol parameters and AIN/IN protocol parameters, as will be described in more detail later.

It should be noted that FIG. 5 is a conceptual illustration. In practice, functions of the various modules will overlap. The MTP module of SMP 106 may handle messages from SSP switches directly, as indicated at 120 in FIG. 5, or indirectly, in the latter case via a STP, as indicated at 122.

As illustrated by broken line path 124 in FIG. 6, "normal" Message Signal Units (MSU), including FISU, LSSU and SNM messages from SSPs 34 and 40 or the MSC 98 simply traverse the physical layer L1 and link layer L2 of the MTP and are redirected, in known manner, using the Origin Point Code and Destination Point Code (OPC/DPC) tables and the SIO, back out again to their appropriate destinations.

If a TCAP message for a normal call is received, it will follow the path shown by chain link line 126 and be screened by the higher layers. The CONVERSION software will not detect the digits 9-1-1 and so will not do any translation.

If the message is an IS41 or GSM RouteRequest message for a mobile 9-1-1 call, and hence has these digits in the dialled digits field, it will follow path 125 and be routed as before to the CONVERSION SOFTWARE module, but in this case the CONVERSION software will detect the 9-1-1 dialled digits and translate the parameters into AIN or IN parameters.

The CONVERSION software will pass the converted parameters to the appropriate AIN/IN component layer module which will include them in an Info_Analyzed message including the destination Point Code of the appropriate SCP 70. The Info_Analyzed message will be processed through the MTP layers and routed to the SCP 70, which will process it in the usual way. When the SCP 70 issues an Analyze_Route message in reply, the SMP 106 will process it in the reverse order to provide a corresponding IS41 RouteRequest response message.

Table IV shows the mapping between IS41 or GSM messages and AIN 0.1 messages and between parameters in those messages.

TABLE IV

| IS-41 | GSM | AIN 0.1 |
|---|---|---|
| Message: | | |
| Route Request | Provide Roaming Number | Info_Analyzed/ Analyze_Route |
| Parameters: | | |
| MIN | MSISDN | Calling Party Number (of Mobile 90) |
| Routing Number | Roaming Number | Destination Number (10 digits) |
| Original Calling Number: NPA-NXX-XXXX | | |
| MSCID | IMSI | NPA-NXX |
| Cell Site # | Cell Site # | XXXX |
| Dialled Digits | Dialled Digits | Dialled Digits |

For the specific example of FIG. 4, the Original Calling Number will comprise the NPA-NX3 of the MSC 98 and the four digit identifier XXX2 of cell site CS2.

The IS41 parameter MIN is a mobile identification number assigned to, and permanently recorded in, the cellular telephone set 90. In North America, it comprises a ten digit number in North American dialling plan format. However, elsewhere it could be in a different format, and even comprise from 7 to 20 digits, depending upon the service provider. Such a number could not be recognized by SCP 70, in which case the SMP 106's conversion software would convert the MIN into a Calling Party number in the form NPA-NXX-XXXX used in AIN 0.1. If an SSP receives a call for a mobile user, such as mobile user 90, the NPA-NX4 number, it will route the call automatically to MSC 98.

The MSC 98 itself will have a first network address MSCID assigned to it within the mobile network and used for communication with the HLR. Within the wireline network, however, it has a second network address NPA-NXX assigned to it. The SMP 106 will convert from either to the other.

The Original Calling Number must have 10 digits. It includes the NPA-NXX of the MSC 98 as its first six digits. The last four digits are the cell site identifier XXXX.

The destination number of the selected PSAP will be included in the AIN/IN response message from the SCP 70 and will be converted into the IS-41 Routing Number used by the mobile switch MSC 98 as the address to which the call is to be routed.

Thus, assuming that mobile station 90 (FIG. 4) makes a 9-1-1 call and is using IS-41, the corresponding message sent to the SMP 106 by the MSC 98, and addressed to the HLR/VLR 102, will comprise a RouteRequest query including a "toggle" flag set to indicate that it is a query rather than a response. (If the GSM protocol is used, the message will be a Provide Roaming Number message with a flag to determine whether it is a query or a response.)

The Route Request message will include the MIN of the mobile user 90, the digits 9-1-1 as the Dialled Digits, the MSCID for MSC 98, and the complete Cell Site number, i.e. identifying the sector within cell CS2 within which the 9-1-1 call originated (the latter as determined by the base transceiver station).

On receipt of the IS41 message, the SMP 106 will detect that the dialled digits comprise the digits 9-1-1. Consequently, the conversion software of SMP 106 will convert the parameters of the IS41 message according to Table IV and include them in an Info_Analyzed message. It will also supply to the SCCP the destination point code of SCP 70 which the SCCP/MTP layers will use to route the Info_Analyzed message to the SCP 70. The SCP 70 will access its routing table 114 using the Original Calling Number which comprises the address NPA-NX3 of mobile switch 98 and the four digit cell site number XXX2 identifying the origin of the call within cell site CS2 to determine the primary PSAP for that particular cell site, in this case PSAP 44 because it is closest. Once again, the SCP 70 will have alternative PSAPs available as shown in Table III and will make the determination as described previously.

The SCP 70 will then select the routing number for the selected PSAP 44, include it as the Called Party number in a TCAP Analyze_Route message and send the message to the SMP 106. It will leave the Calling Party number, mobile switch NPA-NX4 and Original Calling Number fields unchanged. Upon receipt of this TCAP Analyze_Route message, the SMP 106's TCAP APPLICATIONS layer will correlate the response with the query using the Transaction I.D. in known manner. The SMP 106 will convert the parameters back into IS41 format according to Table IV and include them in an IS41 message which it will return to mobile switch MSC 98. The MSC 98 will use the new Routing Number to route the call to the SSP 40 which serves as an end office for the PSAP 44. The SSP 40 will detect the Routing Number in the Called Party number field and complete the call to the PSAP 44. Of course, the SSP 40 could be a combination of an end office and a tandem office, such as those already in existence and described with reference to FIG. 1.

It should be noted that, in AIN, the Routing Number could be placed in either the Destination Number or the Called Party number field and the terminating SSP could complete the call.

It should be appreciated that the MSCID/cell site information in the Original Calling Number could be used for Automatic Location Identification by the PSAP. The ALI 50 would then be provided with software and data to identify a geographical location of a cell site from this MSCID/cell site information. Because the SCP 70 selects the appropriate PSAP based upon the cell site number from which the call originated, the mobile user might no longer be at the location where emergency services were needed. It would be the responsibility of the PSAP operator to interview the caller and determine whether or not the caller was still at the site of the emergency when the 9-1-1 call was placed.

It should be appreciated that the SMP, with its capability for converting between wireline and wireless protocols, is not limited to translation of 9-1-1 calls but could be used for providing other AIN/IN services to mobile users.

It should be appreciated that although only conversion from IS41 to AIN has been described in the specific example, a person skilled in this art would be able to effect conversion from GSM to AIN or IN, or from IS41 to IN, in an analogous manner and without undue experimentation.

Although the foregoing description of a preferred embodiment relates to a so-called "intelligent network", it should be appreciated that a skilled person would be able to implement the invention in other systems which use out-of-band signalling.

Although embodiments of the invention have been described and illustrated in detail, it is to be clearly understood that the same is by way of illustration and example only and not to be taken by way of the limitation, the spirit and scope of the present invention being limited only by the appended claims.

What is claimed is:

1. In a telecommunications network comprising a Service Control Point (SCP), a plurality of Servicing Switching Points (SSP), one or more Public Service Access Points (PSAP) and a Signal Mediation Point (SMP), and a mobile network portion comprising a Mobile Services Switching Centre (MSC) for routing calls from mobile users in cell sites associated with such MSC and a Home Location Register (HLR), the MSC and SSPs being interconnected by trunks for routing calls therebetween, the MSC and SSPs being connected to the SMP by Signaling System No. 7 (SS7) signaling links, the SMP being connected to the SCP and the HLR by respective SS7 links, the SCP having access to a routing table including entries correlating routing numbers of PSAPs with cell site identifiers, the SMP having basic SCP software for handling mobile or wireline TCAP messages and additional conversion software and tables from translating TCAP message parameters according to mobile protocols to TCAP message parameters using intelligent network protocols, the method comprising the steps of:

at the MSC:
upon receipt of a 9-1-1 call from a mobile station, forming a TCAP query message addressed to the destination point code of the HLR and routing the message to the SMP, the message including a mobile identification number (MIN) for the mobile station, a cell site number, and a mobile network address for the MSC, and the dialed digits, at the SMP:
detecting the dialed digits identifying the call as an emergency services call;

translating the parameters in the message as received into corresponding AIN/IN parameters according to the intelligent network protocol being used by the SCP;

forming an AIN/IN TCAP message including the translated parameters, the network address of the MSC and the cell site number being combined in an Original Calling Party number; and overriding the destination point code of the HLR and routing the message to the SCP;

at the SCP:

accessing the mobile routing table using the Original Calling Party number from the received query and obtaining a routing number for a PSAP; and including the PSAP routing number in a TCAP response message and sending this response message to the SMP;

at the SMP:

translating the intelligent network parameters of the TCAP response message into corresponding mobile network parameters; and routing the response message to the MSC, at the MSC:

extracting the PSAP routing number from the TCAP message and routing the emergency services call thereto via one or more of the SSPs.

2. Signal Mediation Point apparatus comprising SS7 software for processing TCAP messages and conversion software for translating parameters of such TCAP messages formulated according to one mobile protocol into parameters according to a different intelligent network protocol, the SMP having signaling links for connection to a Mobile Switching Centre (MSC), a Service Control Point (SCP) and a Home Location Register (HLR), the conversion software being operative, upon receipt of a query from the MSC containing a destination point code for the HLR and dialed digits of an emergency services call to detect said digits, translate the parameters into corresponding intelligent network parameters, override the destination point code of the HLR and rotate the message to the SCP, and on receipt of a response from the SCP, translate the parameters into corresponding mobile network parameters, and route the response message to the MSC.

3. Apparatus according to claim 2, wherein the conversion software is operative to determine a network address of the mobile switching centre and a cell site identifier and combine both into an Original Calling Party number in the intelligent network TCAP message sent to the SCP.

* * * * *